(12) United States Patent
Marya et al.

(10) Patent No.: US 12,359,737 B2
(45) Date of Patent: Jul. 15, 2025

(54) ADDITIVELY MANUFACTURED VALVE SEATS AND SEALS INCLUDING A METAL-THERMOPLASTIC COMPOSITE

(71) Applicant: Schlumberger Technology Corporation, Sugar Land, TX (US)

(72) Inventors: Manuel Marya, Sugar Land, TX (US); Alireza Zolfaghari, Sugar Land, TX (US); Christian Meade, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/482,569

(22) Filed: Sep. 23, 2021

(65) Prior Publication Data
US 2023/0091259 A1 Mar. 23, 2023

(51) Int. Cl.
| | | |
|---|---|---|
| F16K 25/00 | (2006.01) | |
| B33Y 40/20 | (2020.01) | |
| B33Y 80/00 | (2015.01) | |
| B29C 64/118 | (2017.01) | |
| B29L 31/00 | (2006.01) | |
| B33Y 10/00 | (2015.01) | |

(52) U.S. Cl.
CPC ............ F16K 25/005 (2013.01); B33Y 40/20 (2020.01); B33Y 80/00 (2014.12); *B29C 64/118* (2017.08); *B29L 2031/7506* (2013.01); *B33Y 10/00* (2014.12)

(58) Field of Classification Search
CPC ....... F16K 25/005; B33Y 40/20; B33Y 80/00; B33Y 10/00; B29C 64/118; B29L 2031/7506
See application file for complete search history.

(56) References Cited

U.S. PATENT DOCUMENTS

| | | | | |
|---|---|---|---|---|
| 8,256,114 | B2 * | 9/2012 | Hildebrand | F02F 1/36 123/193.5 |
| 11,363,855 | B2 * | 6/2022 | Bellali | B29D 35/142 |
| 11,584,049 | B2 * | 2/2023 | Escowitz | B29C 45/0005 |
| 11,602,886 | B2 * | 3/2023 | Hart | A61F 2/0063 |
| 2009/0068906 | A1 * | 3/2009 | Kawano | B32B 15/08 442/16 |

(Continued)

FOREIGN PATENT DOCUMENTS

| | | |
|---|---|---|
| KR | 1020160034787 A | 3/2016 |
| WO | 2020049295 A1 | 3/2020 |
| WO | 2020216692 A1 | 10/2020 |

OTHER PUBLICATIONS

International Search Report and Written Opinion issued in the PCT Application No. PCT/US202/044078 dated Jan. 12, 2023, 10 pages.

(Continued)

*Primary Examiner* — Craig M Schneider
*Assistant Examiner* — Christopher D Ballman
(74) *Attorney, Agent, or Firm* — Jeffrey D. Frantz (57) ABSTRACT

The disclosure provides for sealing systems including a composite material that includes a thermoplastic lattice structure having interstitial space that is filled with fusible metal. The composite material is formed by additively manufacturing the lattice structure, and then filling the interstitial space with the metal. The composite material may be used to form portions of valves and seals.

20 Claims, 9 Drawing Sheets

(56) References Cited

U.S. PATENT DOCUMENTS

2020/0217321 A1    7/2020  Scancarello et al.
2021/0024255 A1    1/2021  Zumbrum et al.
2021/0234089 A1*   7/2021  Zheng .................... B33Y 30/00

OTHER PUBLICATIONS

Penta Catalog, downloaded on Sep. 20, 2021 at http://www.q-boss.com.au/wp-content/uploads/2017/05/Penta-Catalogue-2016-2017.pdf (96 pages).
3D Lattice Design elements and mechanical responses, downloaded on Sep. 20, 2021 at https://www.fastradius.com/resources/3d-lattice-design-elements/ (7 pages).
International Preliminary Report on Patentability issued in the PCT Application No. PCT/US2022/044078 dated Apr. 4, 2024, 7 pages.

* cited by examiner

ADDITIVELY MANUFACTURED VALVE SEATS AND SEALS INCLUDING A METAL-THERMOPLASTIC COMPOSITE

FIELD

The present disclosure relates to additively manufactured composite materials containing thermoplastics and metals; to valve seats, seals, and other apparatus including the same; to systems including the same; and to methods of making and using the same.

BACKGROUND

Conventional mechanical components with sealing surfaces, such as valve seats and sealing subassemblies, are commonly made out of either polymers, metals with polymeric and elastomeric rings, metals only, or combinations of these in the form of separate, independent components typically stacked-up together. Polymer seats and seals are made of thermoplastic polymers such as polytetrafluoroethylene (PTFE), polyether ketone (PEEK), and reinforced variants thereof (e.g., with glass or graphite). Polymeric soft seats and seals are typically constructed out of a single polymer material. Metal seats and seals that include polymeric O-rings or thermoplastic rings typically include a soft material such as nitrile rubber (NBR), hydrogenated nitrile rubber (HNBR), fluorocarbon-based fluoroelastomers (FKM), and perfluoroelastomers (FFKM). Such seats and seals may lack fluid and environmental compatibility, are subject to damage by debris, and are permeable to gases. Metal seats and seals are made of metals or alloys coated with solid lubricants such as graphite, PTFE, molybdenum disulfides, silver, or other soft metals capable of reducing friction. Metal seats typically include hard sealing surfaces, as opposed to soft sealing surfaces, such as hard surfaces of carbides or nickel plating.

Current thermoplastic seats of ball or gate valves, bushings, and bearings (e.g., of electro submersible pumps) are injection molded of thermoplastic polymer, and are not fabricated by additive manufacturing, partly due to the relatively poor properties of current additive manufactured polymers relative to more traditional solutions. Polymeric seats and seals have difficulty hermetically sealing fluids, particularly gases such as methane, carbon dioxide, and hydrogen due to the relatively small size and atomic/molecular weights of such gases. Thus, such gases often escape pressurized systems, reducing pressure in such systems over time. Also, gases will absorb, diffuse through, and/or permeate the polymeric material, particularly elastomeric materials. The presence of gases, particularly the saturation of gases trapped in a soft material, can lead to explosive decompression blisters (failures) in the polymeric material if sudden depressurization occurs caused by the sudden solubility change and local cooling that makes the polymeric material more brittle. Supercritical fluids can act as a strong solvent to a number of industrial polymers, including elastomers, reducing the applicability of such polymeric materials for use as valve or seals regulating the flow of supercritical fluids. Such fluids, including carbon dioxide under high pressure, can readily dissolve into polymers and cause reduction in mechanical properties such as modulus, in addition to being a source of exploding decompression.

Conventional metal valve seats and seals have an extended thermal range in comparison to polymeric valve seats and seals, and gases and supercritical fluids are typically non-corrosive upon metal valve seats and seals, particularly in the absence of other corrosive species such as water. However, such metal valve seats and seals have limited applicability to gases and supercritical phases due to permeation and leakage of the gases and supercritical phases over contact surfaces, particularly where surface defects in the metal are present (e.g., scratches, corrosion crevices, porosity, etc.).

BRIEF SUMMARY

Some embodiments of the present disclosure include a sealing system for providing a fluid barrier. The system includes a body having a sealing surface. The body includes a composite material. The composite material includes a lattice structure having a frame and interstitial space. The frame includes one or more thermoplastic materials. One or more fusible metals are positioned within at least a portion of the interstitial space at the sealing surface.

Some embodiments of the present disclosure include a method of making a sealing system for providing a fluid barrier. The method includes additively manufacturing a lattice structure. The lattice structure includes a frame and interstitial space. The frame includes one or more thermoplastic materials. The method includes forming a composite material by filling at least a portion of the interstitial space with one or more fusible metals. The method includes forming a sealing system of the composite material. The sealing system has a body with a sealing surface. The one or more fusible metals are positioned within at least a portion of the interstitial space at the sealing surface of the body.

Some embodiments of the present disclosure include a fluid valve. The fluid valve includes a valve body having a sealing surface. The valve body includes a composite material. The composite material includes a lattice structure including a frame and interstitial space. The frame includes one or more thermoplastic materials. One or more fusible metals are positioned within at least a portion of the interstitial space at the sealing surface.

BRIEF DESCRIPTION OF THE DRAWINGS

So that the manner in which the features of the compositions, articles, systems and methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

DETAILED DESCRIPTION

The present disclosure includes a composite material that includes one or more thermoplastic materials and one or more metals (pure or alloy). The thermoplastic material can be in the form of a lattice structure that provides a frame or skeletal structure of the composite material, with the frame defining interstitial space (lattice cells) positioned between the thermoplastic material of the lattice structure. The metal filler can occupy at least a portion of the interstitial space that is defined by the lattice structure. In some embodiments, the lattice structure is formed via additive manufacturing the thermoplastic material into the shape and form of the lattice structure. The metal filler may be infiltrated into the interstitial spaces of the lattice structure. Infiltration may include, but is not limited to, injection of the metal filler into the lattice structure, impregnation of the lattice structure with the metal filler, or percolation of the metal filler into the lattice structure. Some embodiments include an apparatus including the composite material. In some such embodiments, the apparatus is a valve seat, seal, or other portion of a valve assembly. The present disclosure includes valve components and constructions, composite materials, and methods of making and using such components, constructions, and materials.

Thermoplastic Lattice Structure

The thermoplastic lattice structure can be formed by additive manufacturing a thermoplastic material into the shape and form of the lattice structure. The additive manufacturing can include filament winding, for example. FIGS. 1A-1D depict exemplary three-dimensional thermoplastic lattice structures, lattice structures 100a-100d, respectively. FIGS. 2A-2F depict additional examples of lattice structures, lattice structures 200a-200f, respectively. Lattice structure 100a-100d are in the form of or substantially mimic the form of simple cubic, Kelvin cell, body-centered, and body-centered cubic, respectively. Other exemplary forms of the lattice structures disclosed herein include cube vertex centroid, cubic diamond, cubic fluoride, tet vertex centroid, € hex prism vertex, tet oct vertex centroid, hex prism diamond, and hex prism laves phase. Lattice structure 200a-200f are in the form of or substantially mimic the form of rectilinear lattice structure, grid lattice structure, triangular lattice structure, wiggle lattice structure, fast honeycomb lattice structure, and full honeycomb lattice structure, respectively. The lattice structures disclosed herein are not limited to the particular lattice structures shown in FIGS. 1A-2F, and may have other arrangements achievable via additively manufacturing of thermoplastic materials. The lattice structures disclosed herein can be formed into shapes and arrangements that mimic or substantially mimic structures of crystalline materials, but at a macroscopic scale. The lattice structures may be, generally, truss or honeycomb structures, and may provide a frame or skeleton of the composite material, providing an internal structure of the composite material. Similar to crystalline materials, some embodiments of the lattice structures disclosed herein exhibit at least some degree of periodicity in the repeating pattern of the lattice structure.

As shown in the three-dimensional depictions of lattice structures in FIGS. 1A-1D, each lattice structure 100a-100d includes a frame 102a-102d, respectively. Each frame 102a-102d includes the thermoplastic material. In some embodiments, the frames of the lattice structures disclosed herein are entirely composed of thermoplastic material. Each frame 102a-102d defines interstitial space 104a-104d. With reference to FIGS. 2A-2F, each lattice structure 200a-200f includes a frame 202a-202f, respectively. Each frame 202a-202f includes the thermoplastic material. Each frame 202a-202f defines interstitial space 204a-204f. The interstitial space (lattice cells) of the lattice structures disclosed herein may have a lattice cell size ranging from 0.5 mm to 10 mm, as measured by the distance between two nodes of the lattice cell.

Figure 1A:
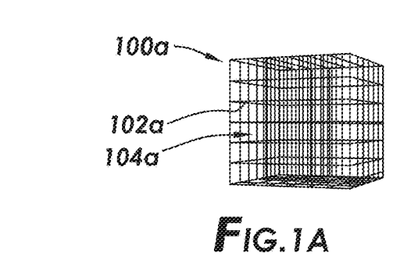
FIGS. 1A-1D depict 3D-printed lattice structures in accordance with some embodiments of the present disclosure.
Figure 1B:
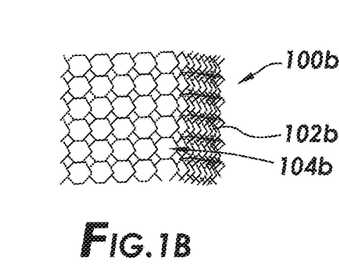
Figure 1C:
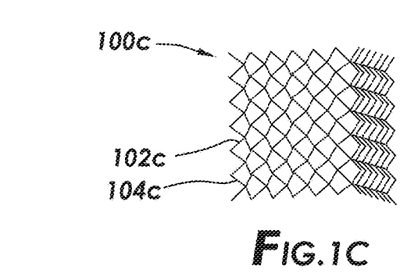
Figure 1D:
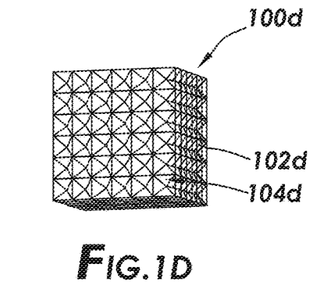
Figure 2A:
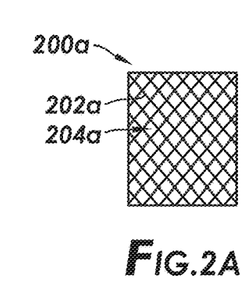
FIGS. 2A-2F depict 3D-printed lattice structures in accordance with some embodiments of the present disclosure.
Figure 2B:
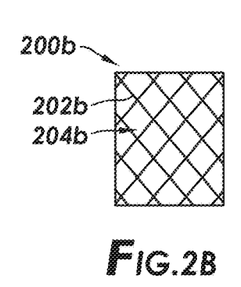
Figure 2C:
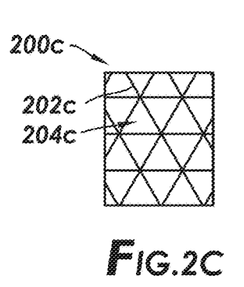
Figure 2D:
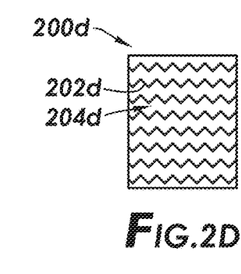
Figure 2E:
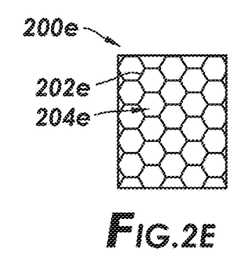
Figure 2F:
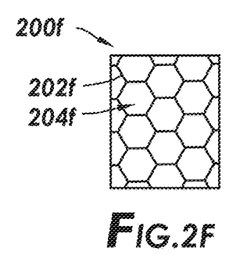
Figure 3:
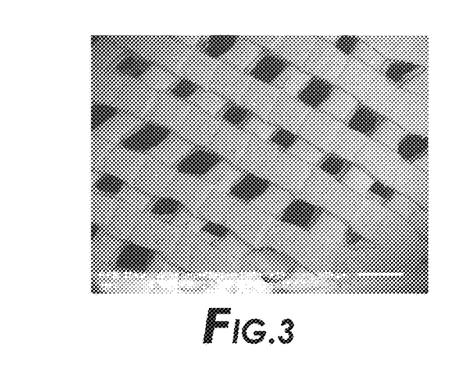
FIG. 3 is a micrograph of an additively-manufactured PEEK-based lattice structure in accordance with some embodiments of the present disclosure.

FIG. 3 is an electron micrograph of additively-manufactured, via fused deposition modeling (FDM), PEEK-based material in the form of a frame or mesh for use as a lattice structure in the composite material disclosed herein. As shown in FIG. 3, a relatively large volume percentage of the frame of additively-manufactured PEEK is unfilled void space between the PEEK. The void space (interstitial space) may be subsequently filled (e.g., infiltrated) with one or more metals, such as metals to form the composite material disclosed herein.

In some embodiments, the lattice structures disclosed herein have a void volume of from 10% to 95%, or from 15% to 90%, or from 20% to 85%, or from 25% to 80%, or from 30% to 75%, or from 35% to 70%, or from 40% to 65%, or from 45% to 60%, or from 50% to 60%, based on a total volume of the lattice structure. As used herein, "void volume" refers to the volume of the interstitial space of the lattice structures disclosed herein, prior to infiltration of the interstitial space to form the composite material. The void volume of a particular lattice structure is equal to the total volume of the lattice structure minus the volume of the frame of the lattice structure, as represented by the following equation, where $V_t$ is the total volume of the lattice structure, $V_f$ is the volume of occupied by the frame of the lattice structure, and $V_v$ is the volume of the interstitial space of the lattice structure.

$$V_t = V_f + V_v$$

In some exemplary embodiments, $V_f$ is 50% or about 50%, and $V_v$ is 50% or about 50%.

Figure 4A:
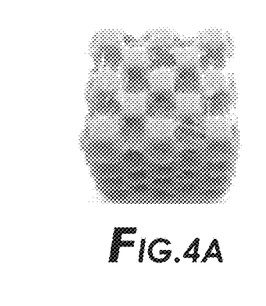
FIGS. 4A and 4B are images of 3D-printed lattice structures of PEEK structure in accordance with some embodiments of the present disclosure.
Figure 4B:
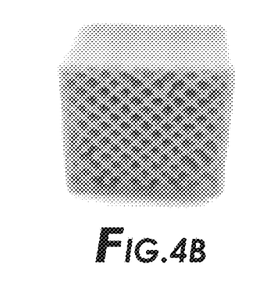

In some embodiments, the thermoplastic material may be or include PEEK. FIGS. 4A and 4B are images of lattice structures of PEEK that have been 3D-printed into the form of a Kelvin cell and a rectilinear cell, respectively.

Exemplary polymers that may be 3D-printed into the form and shape of a lattice structure in accordance with the present disclosure include, but are not limited to: polylactic acid (PLA), Nylon, polyvinylidene fluoride (PVDF), polyether ether ketone (PEEK), polyetherketoneketone (PEKK), polyetherimide (PEI), polyphenylsulfone (PPSU), polyphenylene sulfide (PPS), polyethylene terephthalate (PETG), acrylonitrile styrene acrylate (ASA), polyethylene glycol, polypropylene (PP), and polycarbonate (PC). In some embodiments, the thermoplastic polymer is a composite that contains the polymer and a non-polymeric component. For example, the non-polymeric component may be or include carbon (e.g., graphene, nanotube, graphite), a ceramic (e.g., sulfide, phosphide, fluoride, etc.), or a metal. Table 1, below, is a list of some exemplary polymers with melting points.

TABLE 1

Polymers for 3D-Printing of Lattice Structures

| Polymer | Melting Point |
| --- | --- |
| PLA (dissolves) | ~130° C.–~180° C. |
| Nylon (dissolves) | ~180° C. |
| PVDF | ~177° C. |
| PEEK | ~343° C. |
| PEKK | ~343° C. |
| PEI | ~215° C. |
| PPS | ~280° C. |
| PETG | ~60° C. |
| ABS | ~190° C.–~270° C. |
| ASA | ~135° C. |
| PET | ~260° C. |
| PP | ~160° C. |
| PC | ~288° C.–~316° C. |

Elastic Lattice Structure

Figure 5A:
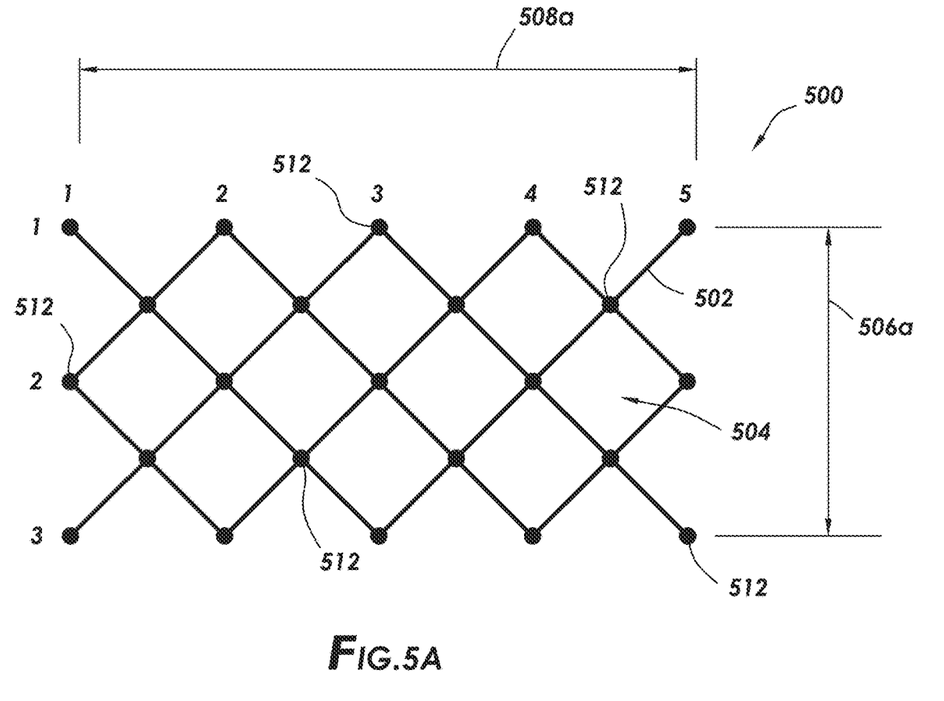
FIG. 5A is a schematic of a lattice structure in an unloaded state in accordance with some embodiments of the present disclosure.
Figure 5B:
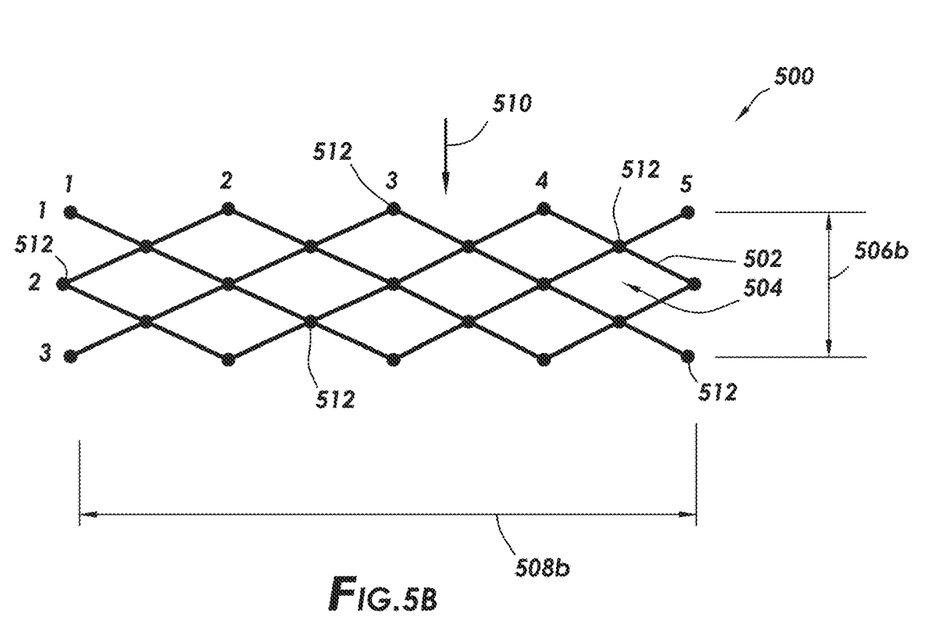
FIG. 5B is a schematic of the lattice structure of FIG. 5A in a loaded state in accordance with some embodiments of the present disclosure.

In some embodiments, the thermoplastic lattice structures disclosed herein are responsive to load. For example, the lattice structures may exhibit elasticity and may function as a spring in the composite material. FIGS. 5A and 5B depict one exemplary simple lattice structure in an unloaded state and a loaded state, respectively. With reference to FIG. 5A, lattice structure 500 is in an unloaded (unenergized) state, and includes frame 502 and interstitial space 504. Lattice structure 500 includes nodes 512, where portions of frame 502 intersect or terminate. In the unloaded state, lattice structure 500 has a height 506a and a width 508a. For example, and without limitation, an unloaded state of the lattice structure may correspond with a valve seat made of the composite material when the valve is open and not engaged with the valve seat. With reference to FIG. 5B, lattice structure 500 is in a loaded (energized) state. Lattice structure 500 is identical to that of lattice structure 500 shown in FIG. 5A, with the exception that load 510 is applied to lattice structures 500 in FIG. 5B such that lattice structure 500 is compressed. Lattice structure 500 includes frame 502 and interstitial space 504. In the loaded state, lattice structure 500 has a height 506b and a width 508b. Height 506b is less than height 506a. Width 508b is greater than width 508a. Thus, the aspect ratio of lattice structure 500 changes between the unloaded and loaded states. A loaded state of the lattice structure may correspond with a valve seat made of the composite material when the valve is closed and is engaged with the valve seat.

In some embodiments, the lattice structure disclosed herein is elastic, such that load compresses the lattice structure, and after removal of the load the lattice structure returns or substantially returns to an uncompressed state. For example, after removal of load 510 in FIG. 5B, lattice structure 500 may return or substantially return to the state of lattice structure 500 as shown in FIG. 5A. Thus, embodiments of the composite materials disclosed herein, and the articles made therefrom, may readily flex under a load and elastically restore after removal of the load. When moving from an unloaded state to a loaded state, or from a state where the lattice structure is not energized to a state where the lattice structure is energized, the lattice structure changes shape (e.g., is compressed). In particular, an aspect ratio of the lattice structure changes between the unloaded and loaded states. The lattice structures elastically store at least some mechanical energy when compressed or energized, similar to a spring. With further reference to FIGS. 5A and 5B, upon being loaded, each node 512 of lattice structure 500 moves to a new coordinate. Upon being unloaded, lattice structure 500 is configured to return or substantially return back to the initial unloaded state, such that each node 512 moves back or substantially back to the previous coordinate occupied by that node 512.

The elasticity of the frames of lattice structures disclosed herein are provided by the particular lattice structural arrangement, the material composition of the frame, or combinations thereof. In some embodiments, the conformation of the lattice structures can be at least partially controlled through the design of the lattice structural arrangement. The lattice structures disclosed herein can be designed to be flexible polymer structures. The ability of the lattice structures to conform to loads may enhance the ability of valve seats and seals to form seals with opposing surfaces during operation.

The lattice structure 500 shown in FIGS. 5A and 5B is conformable to loads. However, as shown, lattice structure 500 is a relatively open structure with a substantial portion of unfilled void space (interstitial space 504). To allow the composite material to function as a fluid barrier that is impermeable to fluids, including gases, interstitial space 504 is filled with one or more materials that are impermeable to fluids, such as liquid, gas, and dense or supercritical phases.

In some embodiments, the elasticity of the composite material, as provided by lattice structure 500 and illustrated in FIGS. 5A and 5B, is maintained after the lattice structure is filled with a metal filler material by providing a zone or layer of the lattice structure that lacks the metal filler material. For example, FIGS. 7B-7D, described in more detail below, illustrate some examples where a lattice structure includes a zone or layer that lacks the metal filler material. The zone or layer may be a void space containing a gas (e.g., air), a vacuum, or a space containing a material other than the metal filler material, such as an elastomer. In some such embodiments, the portion of the lattice structure within the zone or layer that lacks the metal filler material maintains the ability to elastically deform in a manner the same as or similar to that shown in FIGS. 5A and 5B. The degree of the elastic deformation exhibited by the composite material can be varied based on a volume percentage of the lattice structure that contains the metal filler material, the composition of the metal filler material, or the composition of the material other than the metal filler material that is within the lattice structure. In some embodiments, one or more of the cells of the lattice structure are open cells that are in fluid communication with at least some of the other cells of the lattice structure. In some embodiments, one or more of the cells of the lattice structure are closed cells that are not in fluid communication with other cells of the lattice structure. In some such embodiments, open cells of the lattice structure may receive the metal filler material, and the fluid communication between the open cells provides for the flow of the metal filler material between the open cells such that the metal filler material fills the fluidly coupled open cells of the lattice structure (e.g., the metal filler material 716c fills the space of the cells of frame 702c in FIG. 7C). In such embodiments, the closed cells may be closed from receipt of the metal filler material, such that the closed cells form a zone or layer of the composite material that does not contain the metal filler material (e.g., the elastomeric material 720 fills the space defined by frame wall 703 in FIG. 7C).

Composite Material

The composite material includes the polymeric lattice structure combined with a metal filler material. The metal filler material occupies at least a portion of the interstitial space of the lattice structure. In some embodiments, an entirety of the interstitial space of the lattice structure is occupied by the metal filler material disclosed herein.

The interstitial space of the lattice structure may be filled (e.g., infiltrated) with the metal filler material. Filling the interstitial space of the lattice structure with the metal filler material may include dipping the lattice structure into a source of the metal filler material, pouring the metal filler material over the lattice structure, or injecting the metal filler material into the interstitial space of the lattice structure (e.g., injection casting). The present disclosure is not limited to a particular method of filling the interstitial space of the lattice structure with the metal filler material. In some embodiments, the filler material is in a liquid state during the filling of the interstitial space, and is solidified within the interstitial space to form the composite material.

The metal filler material may be a fluid impermeable material. In some embodiments, the metal filler material is a pure metal or a metal alloy. The metal may be or include a self-lubricating, fusible metal. The filler material (e.g., fusible metal) may have a lower melting temperature than a melting temperature of the thermoplastic of the lattice structure. In some embodiments, the filler material has a melting temperature that is lower than the softening point of the thermoplastic of the lattice structure. For example, the filler material may be a metal or other material that liquates, or at least begins melting, at a temperature that is below the melting temperature of the additively manufactured thermoplastic of the lattice structure (e.g., PEEK). The filler material may be a metal or alloy that is liquid above −20° C., above 0° C., above 40° C., above 60° C., above 100° C., above 120° C., above 160° C., above 200° C., above 250° C., above 300° C., or above 320° C., or above 330° C. In some embodiments, the filler material is a metal or alloy that is solid at temperatures that are below 330° C., or below 320° C., or below 300° C., or below 250° C., or below 200° C., or below 160° C., or below 120° C., or below 100° C., or below 60° C., or below 40° C., or below 0° C., or below −20° C.

Some exemplary metals that the filler material may include, but are not limited to, bismuth or alloys thereof, tin or alloys thereof, zinc or alloys thereof, indium or alloys thereof, lead or alloys thereof, and cadmium or alloys thereof.

In some embodiments, the metal is paramagnetic, such as bismuth. In such embodiments, when used as a valve seat or sealing surface, the paramagnetic metal repels debris (e.g., contaminates) away from such surfaces.

In some embodiments, the filler material is a material (e.g., metal) that expands upon solidification (freezing). In such embodiments, the expansion of the filler material within the interstitial space of the lattice structure fills gaps within the interstitial space and reduces or eliminates fluid leak paths within the composite material.

Figure 10:
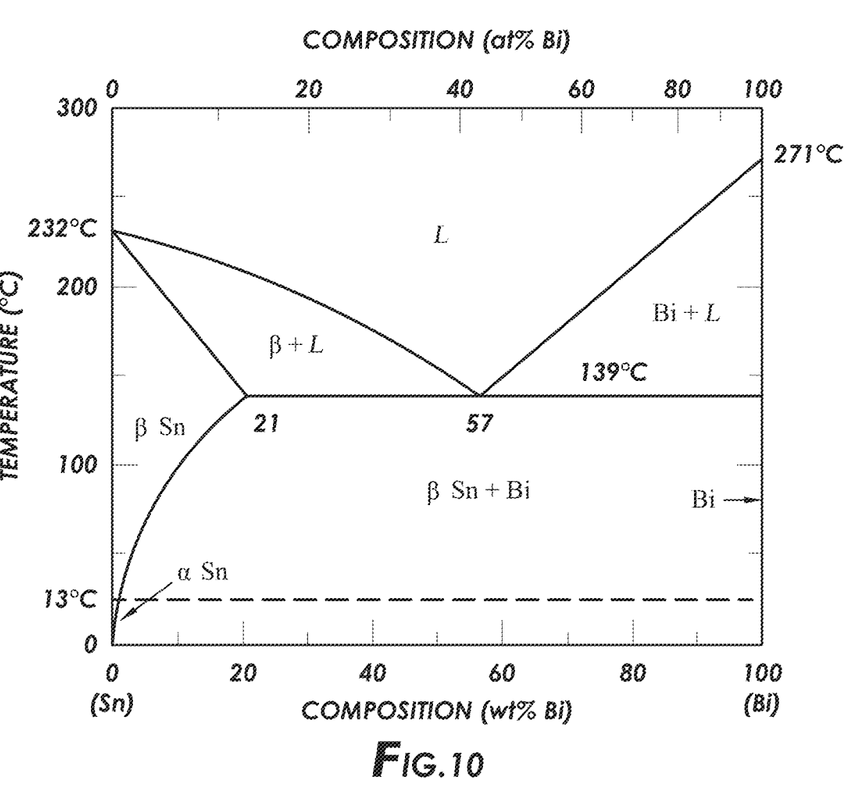
FIG. 10 is a phase diagram of an alloy in accordance with some embodiments of the present disclosure.

One exemplary alloy includes of Bi and Sn. FIG. 10 is a Sn—Bi phase diagram of an alloy containing 57 wt. % Bi and 43 wt. % Sn. The alloy has a melting temperature of 139° C. The alloy of FIG. 10 exhibits volumetric expansion at freezing due to the predominance of bismuth in the alloy, as bismuth expands on freezing. Due to diamagnetic properties, volumetric expansion at freezing (solidification), and compatible melting temperatures, bismuth and alloys thereof are suitable for use as the filler material in some embodiments. Due to the diamagnetic properties of bismuth, when an external magnetic field is applied to bismuth (and to many alloys thereof) bismuth produces a relatively weak repulsive force, enabling the metal to repel magnetic debris, such as ferrous debris, including rust. The ability to repel debris is advantageous in various applications, such as in sealing applications. Another example of an alloy that may be used as the filler material is $Bi_{56}Sn_{40}In_2Zn_2$, having a melting temperature of 126° C. Table 2, below, lists some metal alloys and associated properties suitable for use as the filler material.

TABLE 2

Metal Alloy Filler Materials

| Alloy | Melting Point | Eutectic | Bismuth wt. % | Lead wt. % | Tin wt. % | Indium wt. % | Cadmium wt. % | Thallium wt. % | Gallium wt. % | Antimony wt. % |
|---|---|---|---|---|---|---|---|---|---|---|
| Rose's metal | 98° C. | No | 50 | 25 | 25 | — | — | — | — | — |
| Cerrosafe | 74° C. | No | 42.5 | 37.7 | 11.3 | — | 8.5 | — | — | — |
| Wood's metal | 70° C. | Yes | 50 | 26.7 | 13.3 | — | 10 | — | — | — |
| Field's metal | 62° C. | Yes | 32.5 | — | 16.5 | 51 | — | — | — | — |
| Cerrolow 136 | 58° C. | Yes | 49 | 18 | 12 | 21 | — | — | — | — |
| Cerrolow 117 | 47.2° C. | Yes | 44.7 | 22.6 | 8.3 | 19.1 | 5.3 | — | — | — |
| Bi—Pb—Sn—Cd—In—Tl | 41.5° C. | Yes | 40.3 | 22.2 | 10.7 | 17.7 | 8.1 | 1.1 | — | — |
| Galinstan | −19° C. | yes | <1.5 | — | 9.5-10.5 | 21-22 | — | — | 68-69 | <1.5 |

In some embodiments, the composite material is a two-component composite material including a first material that forms the thermoplastic lattice structure and a second material that forms the metal filler material that occupies the interstitial space. In other embodiments, the composite material is a composite of more than two materials. For example, more than one filler material may be used, more than one material may be used to form the lattice structures, or combinations thereof. In some embodiments, the composite material is a metal-polymer composite material that includes a thermoplastic lattice structure with a metal filler that occupies the interstitial space. In some embodiments, the thermoplastic and the metal are discrete within the composite material. For example, the thermoplastic and the metal are not mixed or blended together. In some embodiments, the frame forms from 5 to 90 percent-by-volume (vol %), or from 10 to 85 vol %, or from 15 to 80 vol %, or from 20 to 75 vol %, or from 25 to 70 vol %, or from 30 to 65 vol %, or from 35 to 60 vol %, or from 40 to 55 vol %, or from 40 to 50 vol % of the lattice structure, based on a total volume of the lattice structure. In some embodiments, the interstitial space forms from 10 to 95 vol %, or from 15 to 90 vol %, or from 20 to 85 vol %, or from 25 to 80 vol %, or from 30 to 75 vol %, or from 35 to 70 vol %, or from 40 to 65 vol %, or from 45 to 60 vol %, or from 50 to 60 vol % of the lattice structure, based on a total volume of the lattice structure.

The composite material has a high-density of internal interfaces, and is capable of sealing fluids across a range of temperatures, such as from −100° C. to 240° C. The lattice structure and filler material of the composite material are geometrically arranged such that the functionalities of a fluid/gas resistant seat and seal, including the ability to be energized, are fulfilled.

In some embodiments, the composite material (and articles made therefrom) exhibits relatively low permeability to liquids, gases, or both liquids and gases. For example, and without limitation, embodiments of the composite material (and articles made therefrom) are impermeable or exhibit low permeability to small molecules, such as hydrogen gas. Such embodiments may be used in flow lines where hydrogen is added to hydrocarbon.

In some embodiments, the composite material (and articles made therefrom) exhibits relatively low friction when engaged against metal alloys used in valve and seal assemblies, resulting from a relatively low shear strength in the sliding direction. The relatively low friction may be caused, at least in part, by: the ductility of the composite material at operating temperature and contact pressure; partial liquation or melting of portions of the composite material at operating temperature and contact pressure; and a readily sheared lamellar structure of the composite material (e.g., where the composite material is a gradient material having periodic structure). Soft metals with a very low coefficient of friction (e.g., as low as 0.06) may be used for actuating gate or ball valves. The soft metal filler material may be softer at elevated temperatures (e.g., at operating temperatures), such that the soft metal filler material smears (shearing of lamellar structure), providing the low friction engagement. In some embodiments, the metal filler material exhibits a dry coefficient of friction of less than 0.3.

In some embodiments, the composite material (and articles made therefrom) exhibits relatively high thermal diffusivity, such that the composite material readily dissipates frictional heat. The thermal diffusivity of the composite material may be entirely (or mostly) provided by the metal filler material.

In some embodiments, the composite material (and articles made therefrom) exhibits environmental and material compatibility, such as a lack of adhesion on mating surfaces within the valve or seal assembly.

Embodiments of the composite materials disclosed herein include a metallic filler material configured to conform to a mating surface (e.g., a ball, gate), self-lubricate, shear, and/or not adhere to the mating surface while enabling relative movement (e.g., ball actuation). The metallic filler material may be soft or semi-liquid at operating temperatures and pressures.

Figure 6:
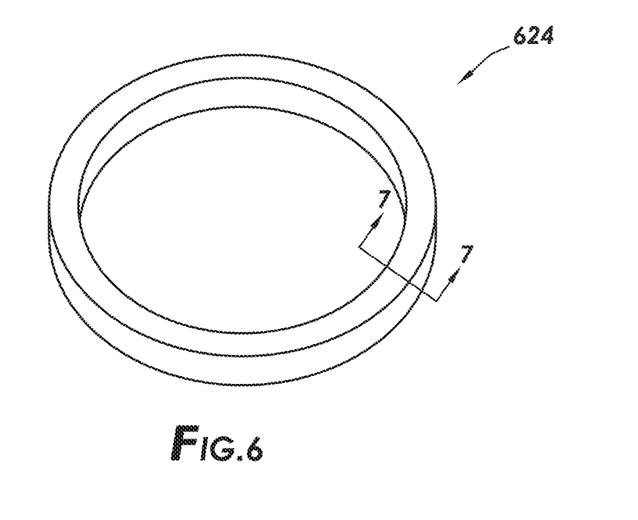
FIG. 6 depicts a valve seat in accordance with some embodiments of the present disclosure.

FIG. 6 depicts an exemplary circular valve seat 624 formed of the composite material. FIGS. 7A-7D are alternative cross-sectional views, along line 7-7, of different embodiments of composite materials that can be used to form circular valve seat 624. FIGS. 7A-7D illustrate a variety of exemplary composite material designs that are configured to exhibit various elastic responses under load, providing a range of sealing pressures.

Figure 7A:
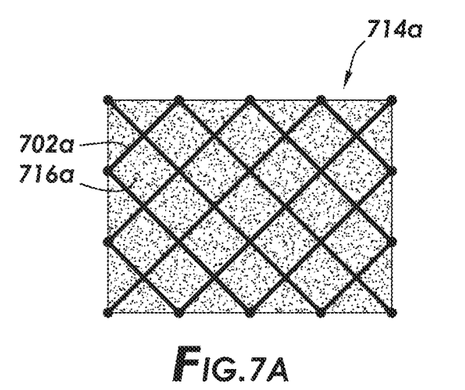
FIGS. 7A-7D are alternative cross-sectional views of FIG. 6, along line 7-7, showing composite materials in accordance with some embodiments of the present disclosure.

With reference to FIG. 7A, composite material 714a includes frame 702a. Frame 702a is a thermoplastic polymer additively manufactured into the shape and form of a lattice structure. Composite material 714a includes filler material 716a. Filler material 716a is positioned within interstitial spaces between portions frame 702a. Filler material 716a may be a fusible metal.

Figure 7B:
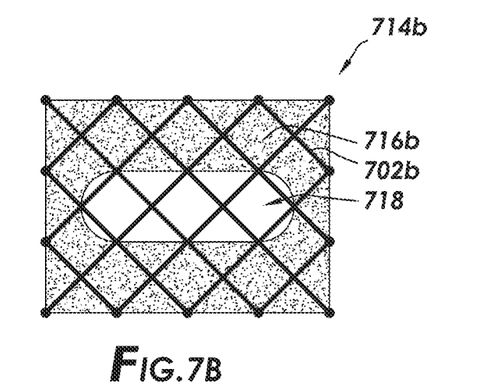

With reference to FIG. 7B, composite material 714b includes frame 702b. Frame 702b is a thermoplastic polymer additively manufactured into the shape and form of a lattice structure. Composite material 714b includes filler material 716b. Filler material 716b is positioned within some of the interstitial spaces between portions frame 702b. Filler material 716b may be a fusible metal. Composite material 714b includes volume 718. Volume 718 may be filled by an additional filler material that is different than filler material 716b, and that occupies a different portion of the interstitial spaces between portions frame 702b. In some embodiments, volume 718 is occupied by a gas. In some embodiments, volume 718 is not filled, and is a vacuum within a portion of interstitial spaces between portions frame 702b.

Figure 7C:
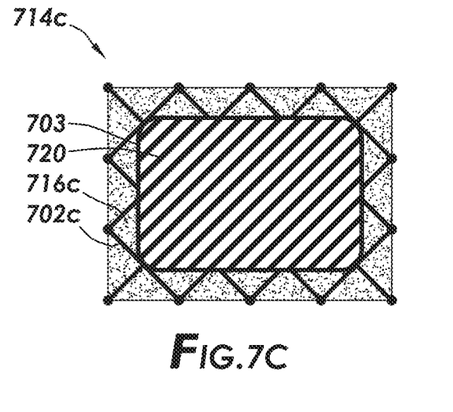

With reference to FIG. 7C, composite material 714c includes frame 702c. A portion of frame 702c, frame wall 703, defines a capsule. Frame 702c, including frame wall 703, is a thermoplastic polymer additively manufactured into the shape and form of a lattice structure that includes the capsule. Composite material 714c includes filler material 716c. Filler material 716c is positioned within some of the interstitial spaces between portions frame 702c. Filler material 716c may be a fusible metal. An elastomeric material 720, such as rubber, is positioned within the capsule defined by frame wall 703, providing additional elasticity to composite material 714c. Frame wall 703 may be 3D-printed to form a solid perimeter that encapsulates elastomeric material 720.

Figure 7D:
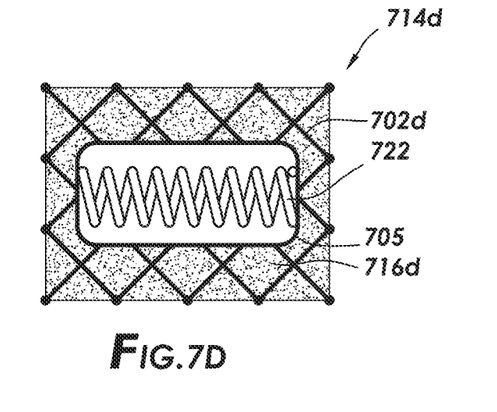

With reference to FIG. 7D, composite material 714d includes frame 702d. A portion of frame 702d, frame wall 705, defines a capsule. Frame 702d, including frame wall 705, is a thermoplastic polymer additively manufactured into the shape and form of a lattice structure that includes the capsule. Composite material 702d includes filler material 716d. Filler material 716d is positioned within some of the interstitial spaces between portions frame 702d. Filler material 716d may be a fusible metal. A mechanical spring 722, such as a metal spring, is positioned within the capsule defined by frame wall 705, providing additional control of the elastic compliance of composite material 714d. Frame wall 705 may be 3D-printed to form a solid perimeter that encapsulates and/or entraps spring 722.

Articles Including the Composite Material

The composite material may be used to make articles. In some embodiments, the article is a valve seat, a seal, or component thereof. For example, the article can be a valve seat of a ball valve, a valve seat of a gate valve, a valve stem, a shaft of a valve, or a hermetic seal. Some embodiments include seal sub-assemblies that are at least partially composed of the composite material. In some embodiments, the article has an axially symmetrical shape.

Figure 8:
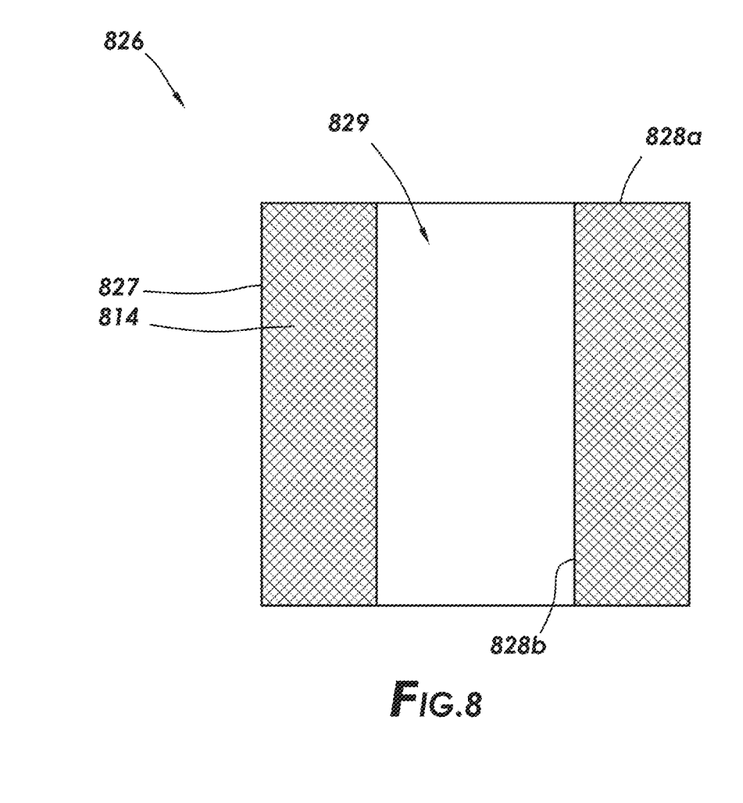
FIG. 8 depicts a valve component in accordance with some embodiments of the present disclosure.

FIG. 8 depicts one exemplary article in accordance with the present disclosure. Valve component 826 is a portion of a valve, and includes body 827. Body 827 at least partially defines valve passage 829. Valve component 826 is at least partially composed of composite material 814. Valve component 826 includes sealing surface 828a (e.g., forming a valve seat) and sealing surface 828b (e.g., to seal with a valve stem) within valve passage 829, each composed of composite material 814.

Figure 9:
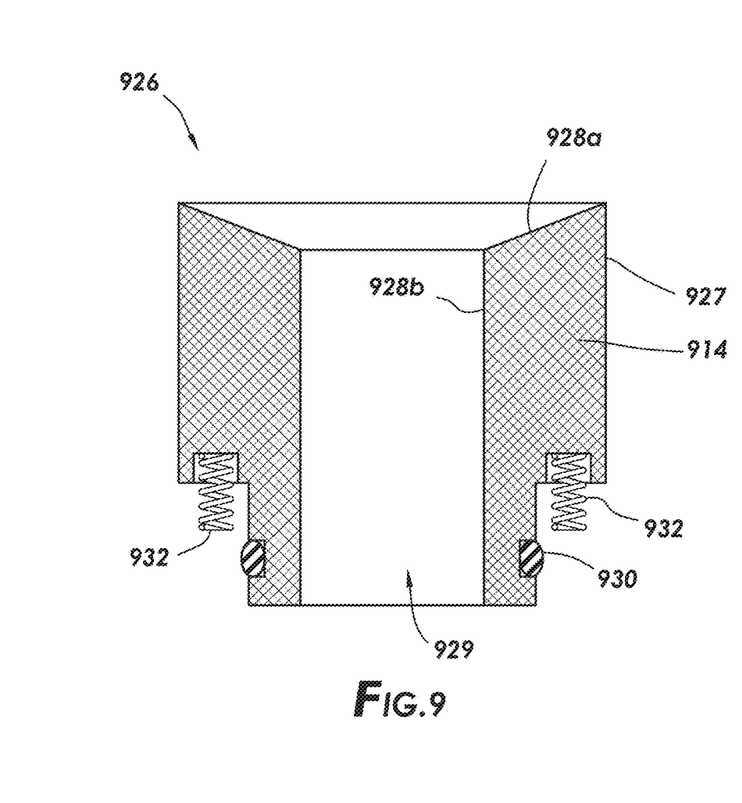
FIG. 9 depicts a valve component in accordance with some embodiments of the present disclosure.

FIG. 9 depicts another exemplary article in accordance with the present disclosure. Valve component 926 is a portion of a valve, and includes body 927. Body 927 at least partially defines valve passage 929. Valve component 926 is at least partially composed of composite material 914. Valve component 926 includes sealing surface 928a (e.g., forming a valve seat) and sealing surface 928b (e.g., to seal with a valve stem) within valve passage 929, each composed of composite material 914. Valve component 926 also includes O-ring 930 for sealing with other components of a valve and springs 932 for spring loading of valve component 926 when valve component 926 is coupled with other components of the valve. The valve components disclosed herein may be relatively simple valve component designs including tubes of various aspect ratios (as shown in FIG. 8), or may be more complex including additional components (as shown in FIG. 9), such as external springs, O-rings, T-seals, and/or conventional sealing stacks.

In the valve component designs of both FIGS. 8 and 9, at least a portion of the bodies of the valve components include an additive manufactured polymeric lattice structure combined with a metal or alloy within the interstitial space thereof, such that the metal or alloy reinforces and augments the sealing performance of the valve component.

Some embodiments of the present disclosure include a monolithic (single and self-containing component) multi-material composite structure that is capable of being energized by mechanical work, similar to a spring, in addition to providing a metal barrier that is impermeable to fluids and exhibits self-lubricating (low friction) characteristics. The combination of stored-spring energy (as described in reference to FIGS. 5A-7D) with smooth, low-temperature, fusible metals as the filler material provides for self-lubricating valve seats and seals. Some embodiments include a monolithic valve seat made of a thermoplastic polymer-soft metal composite that is energizable, such that the monolithic valve seat exhibits elastic response to loads, has a low-friction soft metal surface for engagement with a ball or gate that provides metal-metal sealing for use in flow control applications.

Within a valve seat made of the composite material, the thermoplastic polymer provides the elastic response to loads and contains the metal (e.g., during manufacturing of the valve seat). Within a valve seat made of the composite material, the soft metal filler material forms a soft valve seat surface that provides for sealing with the opposing valve surface, such that a "bubble-tight" shut off of the valve is achievable. In some embodiments, the metal filler material is only applied at critical sealing surfaces where benefits of the metal filler material are advantageous.

The composite material disclosed herein can be used to make valve seats positioned at surface or downhole, and may be used for variety of flow control applications. Valves seats made of the composite material may be impermeable to gases, such as $CH_4$ and $H_2$. Valves seats made of the composite material may be used in fluid systems to prevent leaks due to polymer explosive decompression. For example, valves seats made of the composite material may be used in carbon sequestration applications where explosive decompression can reduce temperature to as low as −60° C.

Figure 11A:
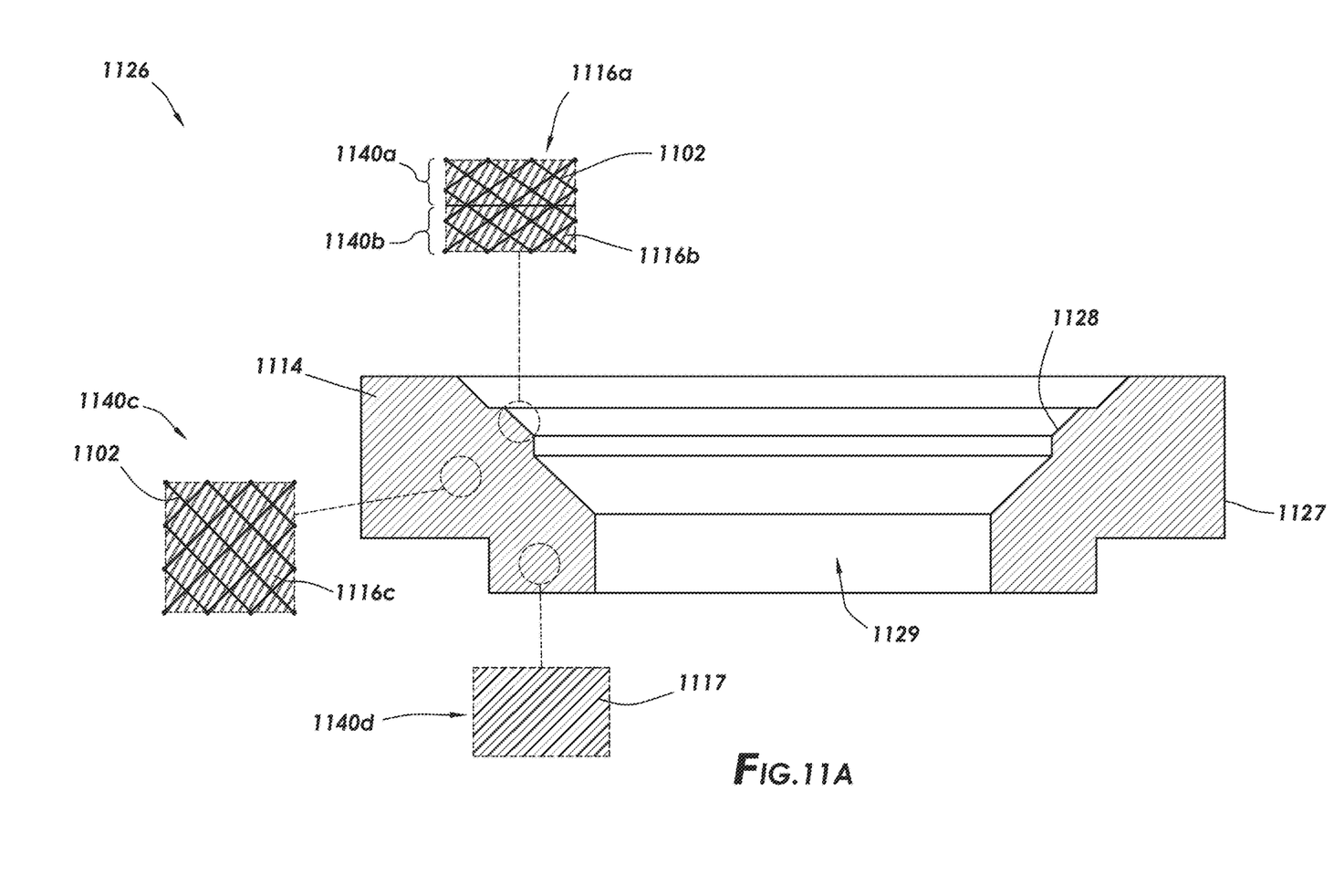
FIG. 11A depicts a ball valve seat in accordance with some embodiments of the present disclosure.

FIG. 11A depicts a ball valve seat 1126 in accordance with some embodiments of the present disclosure. Ball valve seat 1126 includes body 1127. Body 1127 at least partially defines valve passage 1129. Composite material 1114 includes multiple zones of varying material content.

In first material zone 1140a of composite material 1114, at valve sealing surface 1128, composite material 1114 includes first filler material 1116a infiltrated into the interstitial space of frame 1102. The infiltration of first filler material 1116a at valve sealing surface 1128 may form a hermetic/impermeable barrier at valve sealing surface 1128. First filler material 1116a may be a metal or alloy. In some embodiments, first filler material 1116a is a metal or alloy that exhibits low friction.

In second material zone 1140b, at a depth within body 1127 that is below valve sealing surface 1128, composite material 1114 includes second filler material 1116b infiltrated into the interstitial space of frame 1102. Second filler material 1116b may be a non-metal. For example, second filler material 1116b may be a thermoplastic polymer filling. In some embodiments, second filler material 1116b is an elastomer, such as a castable elastomer or rubber. Second filler material 1116b may be 3D-printed into the interstitial space of frame 1102 or otherwise infiltrated therein. The inclusion of an elastomer or rubber may facilitate the reduction or elimination of pressure differentials within the valve components. Pressure differentials within the valve components may be a cause of leaks. The inclusion of an elastomer or rubber may enhance the elastic behavior and shock dampening capabilities of the composite material; thereby, enhancing the ability of a valve seat to tolerate sudden changes in pressure or flow.

In third material zone 1140c, at a depth within body 1127 that is below valve sealing surface 1128 and below second material zone 1140b, body 1127 includes third filler material 1116c. Third filler material 1116c may be a thermoplastic, such as an elastomer.

In fourth material zone 1140d, at a depth within body 1127 that is below valve sealing surface 1128 and below third material zone 1140c, body 1127 includes material 1117. Material 1117 may be a non-metal. Material 1117 may be or include PEEK or a PEEK composite, such as a PEEK and PTFE composite or a PEEK and molybdenum disulfide ($MoS_2$) composite or a PEEK and graphite composite. In some embodiments, material 1117 is 3D-printed.

Figure 11B:
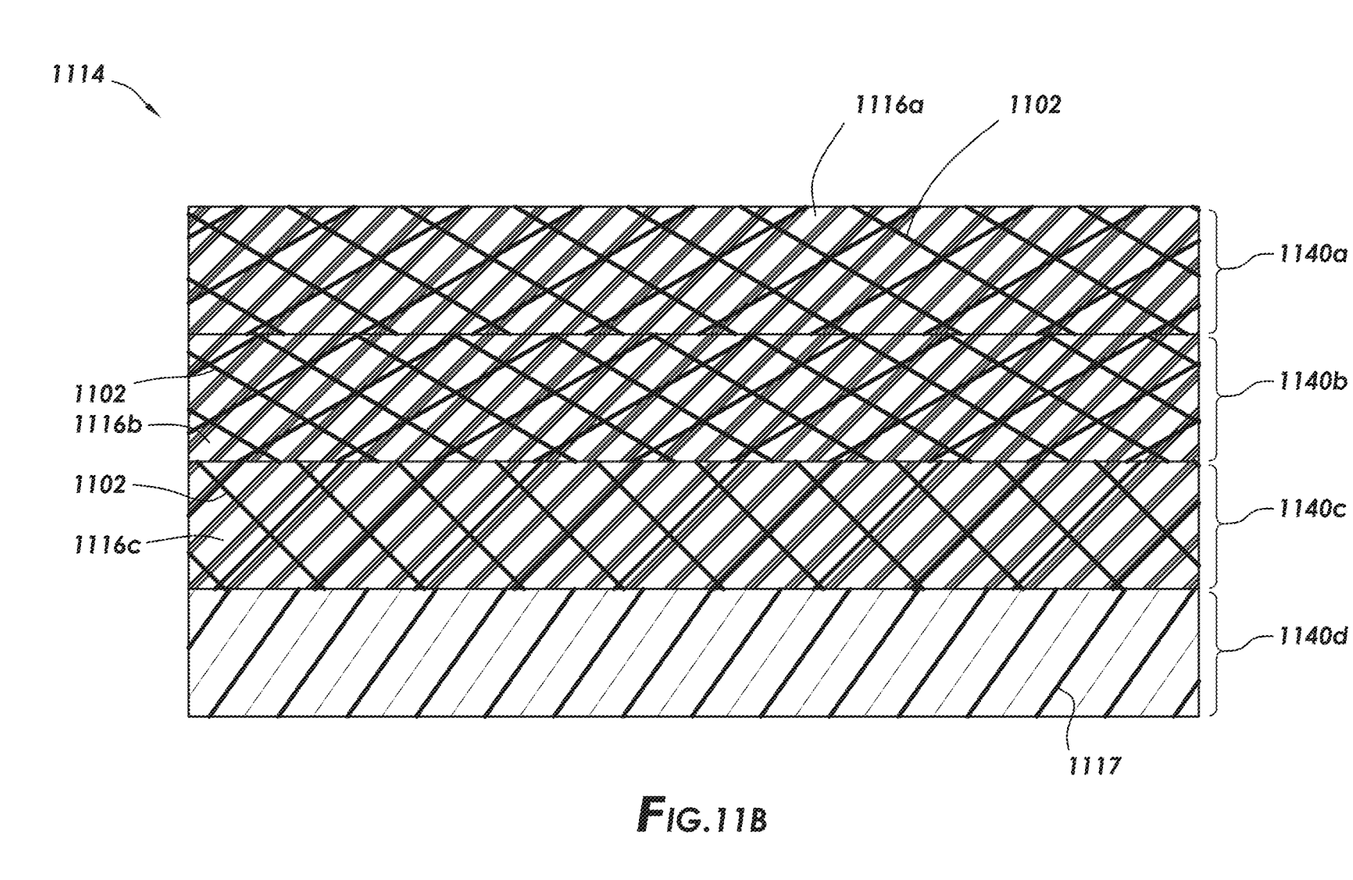
FIG. 11B depicts a composite material in accordance with some embodiments of the present disclosure.

FIG. 11B depicts another view of the composite material 1114 of FIG. 11A. As shown, composite material is a multi-layer or multi-zone material, including first material zone 1140a, second material zone 1140b, third material zone 1140c, and fourth material zone 1140d. First material zone 1140a includes first filler material 1116a infiltrated into the interstitial space of frame 1102. Second material zone 1140b is in contact with and positioned below first material zone 1140a, and includes second filler material 1116b infiltrated into the interstitial space of frame 1102. Third material zone 1140c is in contact with and positioned below second material zone 1140b, such that second material zone 1140b is positioned between first material zone 1140a and third material zone 1140c. Third material zone 1140c includes third filler material 1116c infiltrated into the interstitial space of frame 1102. In some embodiments, the frames in the different material zones have the same material composition, lattice form, or combinations thereof. In other embodiments, the frames in the different material zones differ in material composition, lattice form, or combinations thereof. Fourth material zone 1140d is in contact with and positioned below third material zone 1140c, such that third material zone 1140c is positioned between second material zone 1140b and fourth material zone 1140d.

In some embodiments, upon exposure to operating temperatures and pressures, the composite material disclosed herein exhibits increased strength. For example, the thermoplastic polymer of the frame may exhibit increased strength as a result of an increase in crystallinity of the polymer at the operating temperatures and pressures (e.g., PEEK may increase in crystallinity). In some embodiments, upon exposure to operating temperatures and pressures, the soft metal filler material exhibits increased softness and shears (smears) more readily; thereby providing for low friction engagements. In embodiments of the composite material containing a rubber filler material, upon exposure to operating temperatures and pressures the rubber filler material exhibits a reduction in compliance.

Method of Making a Composite Material

Figures 12, 13A, 13B:
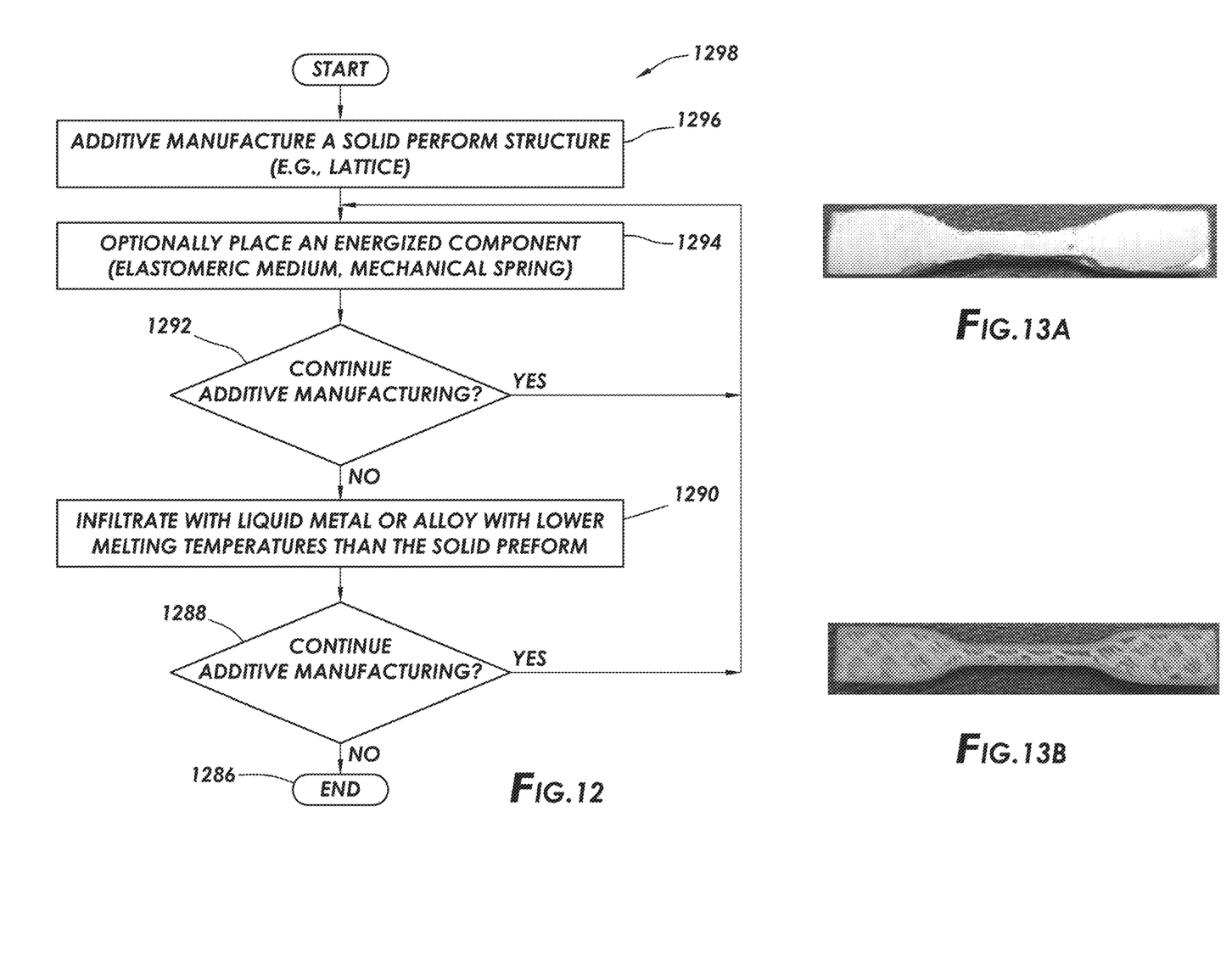
FIG. 12 is a flow chart of a method of making a composite material in accordance with some embodiments of the present disclosure.
FIG. 13A is an image of a 3D-printed lattice structure in accordance with some embodiments of the present disclosure.
FIG. 13B is an image of a 3D-printed lattice structure with a metal infiltrated therein in accordance with some embodiments of the present disclosure.

Some embodiments include a method of making the composite material disclosed herein. FIG. 12 is a schematic of one exemplary method of making the composite material. Method 1298 includes additively manufacturing a solid preform structure for use as a lattice structure, box 1296. Method 1298 includes optionally placing an energized component within the solid preform structure, box 1294. The energized component may be an elastomer or mechanical spring. Method 1298 includes optionally continuing to additively manufacture the solid preform structure, box 1292. Method 1298 includes infiltrating the solid preform structure with a filler material, box 1290. Infiltrating the solid preform structure with the filler material may include infiltrating a liquid metal into the solid preform structure. The liquid metal may be a metal that has a melting temperature that is lower than a melting temperature of the solid preform structure. Method 1298 includes optionally continuing to additively manufacture the solid preform structure, box 1288. Method 1298 includes obtaining the composite material, box 1286. While the filler material is disclosed as being added via infiltrating (e.g., via pressure infiltration), the methods disclosed herein are not limited to "infiltrating" and the metal may be provided into the interstitial space of the lattice structures by other methods. The filler material may be poured into the interstitial space of the lattice structure, the lattice structure may be dipped into a liquid filler material, the filler material may be injected into the interstitial space of the lattice structure, the filler material may be percolated into the interstitial space of the lattice structure, or the filler material may be impregnated into the interstitial space of the lattice structure. Thus, the filler material may be provided within or forced into the interstitial space of the lattice structure by various methods.

The solid preform structure may be made on a layer-by-layer basis by depositing the thermoplastic polymer layer-by-layer. For example, the solid preform structure may be made using a filament winding machine, where a filament of the thermoplastic polymer is extruded in place. The preform structure may be made using other processes where the thermoplastic polymer is deposited and cured (hardened) in place, such as by using heat, light (UV), ultrasonic, or other sources of energy. The method disclosed herein is not limited to the steps shown in FIG. 12. For example, the order of the steps may be changed, some steps may be performed simultaneously, some steps may be eliminated, and additional steps, before and/or after those shown in FIG. 12, may be added. For example, the composite material may be subjected to a pressure cycle to close gaps in the composite material.

In some embodiments, the process is a near net shape process, such that the valve seat (or other article) is formed with or near its final shape and requires little or no additional processing. The construction of the article can evolve as the preform structure is built from the bottom-up using additive manufacturing (e.g., a filament deposition/extrusion process). In other embodiments, the composite material is made in a bulk form that is subsequently shaped into the form of an article, such as a valve seat.

FIG. 13A is an image showing a preformed lattice structure of a miniature tensile bar formed in accordance with the method, prior to infiltration with a metal filler material. FIG. 13B is an image showing a lattice structure formed in accordance with the method, after infiltration with Field's metal. The test samples of FIGS. 13A and 13B were infiltrated by hot bath immersion. The hot bath immersion included providing a liquid low-temperature eutectic alloy, Field's metal, that was formed in a deoxidizing environment at temperature. The lattice structure was preheated to a temperature approximately equal to the temperature of the hot bath of liquid Field's metal. With the lattice structure preheated to the temperature, the lattice structure was placed into the hot bath of liquid Field's metal and left in the hot bath of liquid Field's metal to promote wetting and capillary infiltration of the lattice structure until the liquid Field's metal infiltrated into the cells of the lattice structure.

Applications

The articles disclosed herein may be or include, valve seats, and seals (e.g., hermetic seals). The operational temperature range of the articles disclosed herein may be from −100° C. to 240° C. Some exemplary valves, seals, or components thereof that may be formed of the composite material include ball valves, gate valves, valve stems, rotary seals, primary seals, secondary seals, and stem backseats. The composite material may be used to make other seals, such as packers and liner hanger seals used in downhole applications.

Figure 14:
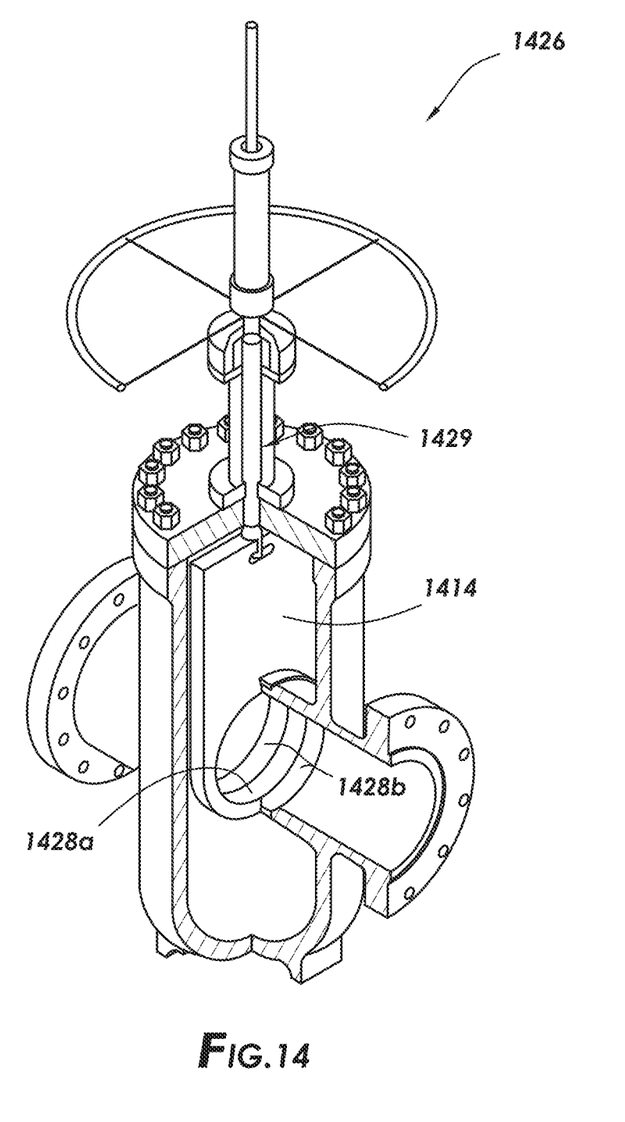
FIG. 14 depicts a gate valve in accordance with some embodiments of the present disclosure.

FIG. 14 depicts one exemplary gate valve 1426, with sealing surfaces 1428a and 1428b and valve stem 1429, each made of a composite material 1414 in accordance with the present disclosure. The gate valve 1426 may be used in geothermal energy applications or other applications.

The articles may be used in mid-stream applications, production applications, downhole completion applications, subsea applications, and geothermal applications. For example, the articles may be used in carbon sequestration applications, and for providing seals that are impermeable to hydrogen (e.g., hydrogen produced in subterranean environments). The articles may be used to reduce or prevent fugitive emissions. One exemplary application of the composite materials is to form downhole lubricator valves.

While described in reference to valves and seals used in downhole and other oil and gas related applications, the composite material disclosed herein is not limited to such uses, and may be used to make other articles.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system for providing a fluid barrier, the system comprising:
    a body, the body comprising a sealing surface, wherein the body comprises a composite material; and
    the composite material includes a first zone and a second zone in contact with each other, wherein:
        the first zone has a first lattice structure having a first frame that is a lattice cell shaped by a first thermoplastic polymer, and one or more fusible metals are positioned in an interstitial space of the first frame; and
        the second zone has a second lattice structure having a second frame that is a lattice cell shaped by a second thermoplastic polymer, and a non-metal material is positioned in an interstitial space of the second frame,
    wherein the one or more fusible metals are configured to produce the sealing surface; and
    wherein the sealing surface exhibits a coefficient of friction of less than 0.3 when engaged against the one or more fusible metals.

2. The system of claim 1, wherein the first thermoplastic polymer comprises polylactic acid, nylon, polyvinylidene fluoride, polyether ether ketone, polyetherketoneketone, polyetherimide, polyphenylsulfone, polyphenylene sulfide, polyethylene terephthalate, acrylonitrile styrene acrylate, polyethylene glycol, polypropylene, or polycarbonate.

3. The system of claim 1, wherein the one or more fusible metals comprise bismuth or an alloy thereof, tin or an alloy thereof, zinc or an alloy thereof, indium or an alloy thereof, lead or an alloy thereof, or cadmium or an alloy thereof.

4. The system of claim 1, wherein the one or more fusible metals have a lower melting temperature than a melting temperature of the first thermoplastic polymer.

5. The system of claim 1, wherein the one or more fusible metals are paramagnetic.

6. The system of claim 1, wherein a volume of the interstitial space of the first frame is from 10% to 95% of a total volume of the first lattice structure.

7. The system of claim 1, wherein the lattice structure of the first frame is elastically deformable.

8. The system of claim 1, wherein the one or more fusible metals are positioned within a first portion of the interstitial space of the first frame, and wherein a second portion of the interstitial space of the first frame comprises a gas, an elastomer, or a mechanical spring.

9. The system of claim 1, wherein the first zone extends from the sealing surface of the composite material to a first depth within the composite material, and the second zone extends from the first depth to a second depth within the composite material.

10. The system of claim 9, wherein the non-metal material comprises an elastomer.

11. The system of claim 1, wherein the sealing surface is a surface of a ball valve, a gate valve, a packer, a liner hanger seal, or a downhole lubricator valve.

12. The system of claim 1, wherein the first frame forms from 5 to 90 percent-by-volume of the first lattice structure, based on a total volume of the first lattice structure.

13. The system of claim 1, wherein the first lattice structure is in direct contact with the second lattice structure.

14. The system of claim 1, wherein the first thermoplastic polymer and the second thermoplastic polymer comprise a same thermoplastic polymer.

15. A method of making a sealing system for providing a fluid barrier, the method comprising:
    additively manufacturing a lattice structure, the lattice structure comprising a frame and an interstitial space, wherein the frame comprises one or more thermoplastic materials and the interstitial space includes a first portion and a second portion;
    forming a composite material by:
        filling the first portion of the interstitial space with one or more fusible metals; and
        filling the second portion of the interstitial space with a non-metal material, wherein the filling of the first portion of the interstitial space comprises pressure infiltration of the one or more fusible metals into the first portion of the interstitial space, dipping the lattice structure into a source of the one or more fusible metals, injecting the one or more fusible metals into the first portion of the interstitial space, or percolating the one or more fusible metals into the first portion of the interstitial space in liquid or semi liquid form; and
    forming a sealing system of the composite material, the sealing system having a body with a sealing surface, wherein the one or more fusible metals are positioned within the second portion of the interstitial space at the sealing surface of the body.

16. The method of claim 15, wherein additively manufacturing the lattice structure comprises fused deposition modeling.

17. The method of claim 15, wherein the one or more fusible metals are in a liquid state during the filling of the first portion of the interstitial space.

18. The method of claim 17, further comprising solidifying the one or more fusible metals within the first portion of the interstitial space.

19. The method of claim 18, wherein the one or more fusible metals expand upon solidification.

20. A fluid valve, the valve comprising:
    a valve body, the valve body having a sealing surface, wherein the valve body comprises a composite material; and
    the composite material includes a first zone and a second zone in contact with each other, wherein:
        the first zone has a first lattice structure having a first frame and interstitial space, wherein the first frame is a lattice cell shaped by a first thermoplastic polymer, and one or more fusible metals are positioned within at least a portion of the interstitial space of the first lattice structure at the sealing surface; and
        the second zone has a second lattice structure having a second frame and interstitial space, wherein the second frame is a lattice cell shaped by a second thermoplastic polymer, and a non-metal material is positioned within at least a portion of the interstitial space of the second lattice structure.

* * * * *